US008672557B2

(12) United States Patent
Horling et al.

(10) Patent No.: US 8,672,557 B2
(45) Date of Patent: Mar. 18, 2014

(54) BEARING ARRANGEMENT FOR A TENSION ROLLER

(75) Inventors: Peter Horling, Mainberg (DE); Sandra Kamm, Gochsheim (DE); Edgar Pickel, Sommerach (DE); Armin Olschewski, Schweinfurt (DE); Rudolf Gattringer, Tragwein (AT)

(73) Assignee: Aktiebolaget SKF, Gothenburg (SE)

( * ) Notice: Subject to any disclaimer, the term of this patent is extended or adjusted under 35 U.S.C. 154(b) by 706 days.

(21) Appl. No.: 12/808,160

(22) PCT Filed: Dec. 8, 2008

(86) PCT No.: PCT/EP2008/010395
§ 371 (c)(1),
(2), (4) Date: Nov. 5, 2010

(87) PCT Pub. No.: WO2009/077101
PCT Pub. Date: Jun. 25, 2009

(65) Prior Publication Data
US 2011/0038577 A1 Feb. 17, 2011

(30) Foreign Application Priority Data
Dec. 14, 2007 (DE) .......................... 10 2007 060 906

(51) Int. Cl.
*F16C 27/00* (2006.01)
(52) U.S. Cl.
USPC ........................................................ 384/536
(58) Field of Classification Search
USPC .................. 384/535, 536, 546, 581, 582, 586
See application file for complete search history.

(56) References Cited

U.S. PATENT DOCUMENTS

| 3,268,423 | A | | 8/1966 | Tomaszewski et al. |
| 3,844,910 | A | | 10/1974 | Lipp et al. |
| 5,433,308 | A | * | 7/1995 | Gagnon ......................... 193/37 |
| 5,865,290 | A | * | 2/1999 | Scott .............................. 193/37 |
| 6,234,293 | B1 | * | 5/2001 | Fasoli ............................. 193/37 |
| 6,287,014 | B1 | * | 9/2001 | Salla ............................. 384/546 |

FOREIGN PATENT DOCUMENTS

| AT | 215677 B | 6/1961 |
| DE | 811694 C | 8/1951 |
| DE | 818755 C | 10/1951 |

(Continued)

OTHER PUBLICATIONS

Translation of DE811694 obtained Feb. 19, 2013.*

(Continued)

*Primary Examiner* — James Pilkington
(74) *Attorney, Agent, or Firm* — Bryan Peckjian; SKF USA Inc. Patent Dept.

(57) ABSTRACT

A bearing arrangement (1) for a tension roller (2) designed as a hollow cylinder at least in segments, having at least one bearing (3) supporting the tension roller (2), wherein a damping layer (5) made of elastomer or rubber material is disposed between a ring (4) of the bearing (3) and the tension roller (2), directly or indirectly, and wherein at least one axial end of the tension roller (2) is closed by a cover (6). In order to achieve a low-noise and self-centering seal for the axial end of the tension roller, according to the invention, the cover (6) is disposed in a mounting segment (8) and is held by the same, said segment being molded from the material of the damping layer in an axial end region of the damping layer (5).

18 Claims, 3 Drawing Sheets

(56) References Cited

FOREIGN PATENT DOCUMENTS

| DE | 1738837 | U | 1/1957 |
|---|---|---|---|
| DE | 1224510 | B | 9/1966 |
| DE | 1947475 | U | 10/1966 |
| DE | 1521063 | A1 | 8/1969 |
| DE | 2236443 | A1 | 2/1974 |
| DE | 29521198 | U1 | 12/1996 |
| DE | 102007060968 | * | 7/2008 |
| GB | 933406 | A | 8/1963 |
| GB | 1542116 | A | 3/1979 |

OTHER PUBLICATIONS

Translation of DE102007060968 obtained Feb. 19, 2013.*

* cited by examiner

BEARING ARRANGEMENT FOR A TENSION ROLLER

BACKGROUND OF THE INVENTION

The invention relates to a bearing arrangement for an at least partially hollow-cylindrically designed carrying roller, with at least one bearing supporting the carrying roller, a damping layer composed of elastomeric or rubber material being arranged directly or indirectly between a ring of the bearing and the carrying roller, and at least one axial end of the carrying roller being closed off by means of a cover.

For the mounting of carrying rollers, the prior art discloses various possibilities which also include the special refinement whereby a layer of damping material is arranged, for the purpose of improved damping, between the carrying roller and the bearing mostly designed as a rolling bearing.

DE 1 738 837 U discloses a generic bearing arrangement. An elastomeric damping layer is used here, which is of block-shaped form in radial section and has contractions in its two axial end regions. A high damping capacity of the bearing arrangement can be achieved by means of this damping layer. In order to protect the axial end of the carrying roller against the penetration of dirt, a cover is attached to the bearing arrangement on the end face.

One disadvantage of the previously known solution is that the cover constitutes a noise source on account of the possibility of being excited into oscillations. Furthermore, a certain outlay in manufacturing terms is involved in order to ensure that the cover comes to lie concentrically with respect to the axis, this being essential for running where unbalance is low.

SUMMARY OF THE INVENTION

The object on which the invention is based, therefore, is to develop a bearing arrangement of the type initially mentioned, so that it becomes possible in a simple way to ensure an oscillation-damping attachment of the cover, in which case this is to become possible in a simple way in manufacturing and assembly terms. Furthermore, in many applications, it is desirable to ensure the leaktightness of the cover, so that no impurities or moisture can penetrate into the interior of the bearing arrangement, and this is to be achieved by virtue of the invention. In order to ensure a good running behavior, at the same time the cover is to be arranged in a self-centering manner in its receptacle.

The solution for achieving this object by means of the invention is characterized in that the cover is arranged in a holding portion and is held by the latter which is shaped out of the material of the damping layer in an axial end region of said damping layer.

Preferably, in this case, there is provision for the cover to have an annular portion which extends in the axial direction and which is arranged in the holding portion and is held by this.

In this case, preferably, the holding portion has a radially inwardly directed cylindrical seat surface. A radially inwardly directed projection may be arranged in the axial end region of the cylindrical seat surface. Said projection may proceed annularly around the entire circumference of the holding portion.

The damping layer preferably has a bearing surface facing the cover and arranged radially within the holding portion. The bearing surface in this case advantageously has a surface normal which points in the axial direction. An axially extending recess in the form of an annular groove may be arranged between the holding portion and the bearing surface.

The holding portion preferably extends axially as far as the axial position of a radially extending outer surface of the cover.

At least one recess may be incorporated into the damping layer radially outside the holding portion. Said recess may proceed in the form of an annular groove around the entire circumference of the damping layer. It is also possible, however, that a number of recesses are arranged so as to be distributed over the circumference of the damping layer. In this case, webs may remain in the damping layer between the recesses. The webs may be arranged equidistantly around the circumference of the damping layer.

The mounting of the cover is made easier if there is provision for the annular portion, extending in the annular direction, of the cover to have an introduction slope.

Preferably, a sleeve-shaped body is arranged in at least one axial part region of the carrying roller between the inner cylindrical surface of the carrying roller and the damping layer. The sleeve-shaped body may project axially beyond the carrying roller on one side and have in the axial end region of the carrying roller a radially outwardly extending collar.

The damping layer is preferably designed as a thin-walled hollow-cylindrical element.

A carrier body may be arranged between the damping layer and one ring of the bearing.

It is especially advantageous if there is provision, further, for that inner surface of the carrying roller which faces the sleeve-shaped body and/or for that outer surface of the sleeve-shaped body which faces the carrying roller to be provided with a coating having a friction-increasing property. This coating having a friction-increasing property preferably in this case has diamonds, silicon carbide (SIC), corundum or boron nitride (CBN). The diamonds, silicon carbide, corundum or boron nitride are in this case present mostly as grain with a diameter range of between 1 μm and 100 μm, preferably of between 10 μm and 80 μm. According to a preferred refinement of the invention, the diamonds, silicon carbide, corundum or boron nitride may be bound on the carrying roller and/or on the sleeve-shaped body by means of a binder. The binder may be a metallic layer, in particular a nickel layer. This is preferably applied by means of an electroplating process. The coating having a friction-increasing property may also be a molybdenum layer. This is preferably applied by flame spraying.

In this case, in the assembled state, a press fit is preferably present between the carrying roller and the sleeve-shaped body.

It is also possible, for the purpose of corrosion protection, to contemplate a complete or partial provision of one component or of the components with the coating and/or with the binder.

The radially outwardly extending collar and the carrying roller may be connected to one another in the axial end region of the carrying roller. In this case, in a preferred refinement, this connection is made by means of an adhesive joint. This has advantages in terms of the leaktightness of the bond between the two components, this being important particularly on account of a capillary action between the two components. Furthermore, an adhesive joint has a positive effect with regard to corrosion protection. In another solution, the radially outwardly extending collar and the carrying roller are welded to one another. In this case, preferably, a weld seam is provided which is designed to proceed completely around the circumference of the carrying roller. A frictional connection is also possible. The type of connection is selected, as a rule, on the basis of the magnitude and direction of the axial force.

Furthermore, at least one sealing element may be arranged between the carrying roller and the sleeve-shaped body, in order to protect the arrangement against the penetration of dirt and moisture. The sealing element is in this case preferably an O-ring.

Means for preventing an axial relative displacement between the sleeve-shaped body and the damping layer have also proved appropriate. These means may be formed by at least one radially projecting portion on the sleeve-shaped body, said portion engaging axially over the damping layer. In another refinement, the means are formed by a portion projecting radially inwardly on the sleeve-shaped body. This radially inwardly projecting portion may be in the form of a point in radial section; it may also be produced by a pressing-in or rolling-in action which is introduced into a radially outwardly pointing surface of the sleeve-shaped body.

The damping layer preferably consists of an elastomer or of rubber material. Rubber material, in particular NBR with a Shore hardness of at least 40, has proved especially appropriate.

The sleeve-shaped body and, if appropriate, the carrier body mostly consist of metal, in particular of steel.

The at least one bearing is preferably a rolling bearing.

The carrying roller is preferably designed as a tube with a constant wall thickness, which is mounted in each of the two axial end regions by means of a bearing.

What is achieved by the proposed solution is that the mounting of the cover can take place in a simple way, a self-centering action for the cover with respect to the axis of rotation being obtained. The seal works effectively since both radial and axial sealing surfaces are obtained. By the holding of the cover being implemented in this way, oscillations into which the cover is excited are also damped optimally, thus resulting in a low-noise arrangement.

Furthermore, the proposed bearing arrangement affords the advantage that, as a result of the preferred introductions of the sleeve-shaped body into the carrying roller, the tolerances of the carrying roller tube inside diameter are allowed to be relatively approximate, without presenting problems. Consequently, in this respect, no separate mechanical machining is required. The outlay in machining terms can consequently be reduced.

The damping layer provided, preferably composed of elastomeric or rubber material, ensures circularity compensation and oscillation decoupling.

Furthermore, as a result, shock-like loads are absorbed more effectively. The sleeve-shaped body, together with the damping layer, if appropriate the carrier body and bearing, together with the seal, may be produced as a unit which is installed as such on the conveyor plant to which the carrying roller belongs. This results in logistic benefits. Mounting may take place by the sleeve-shaped body simply being pressed into the carrying roller.

A further substantial advantage of the proposed solution when the friction-increasing coating is used is that axial fastening can be improved, with the result that micro movements can be prevented. This, in turn, reduces the formation of fretting corrosion. Moreover, maximum torques can thereby be transmitted, without a loosening of the connection of the components occurring. Furthermore, a slipping of components is largely ruled out. This becomes noticeable especially advantageously when, during the operation of the carrying roller, bending under rotation occurs which, because of the selected configuration of the bearing arrangement, cannot exert any adverse affect.

Conversely, a smaller and lighter design of the bearing arrangement is thereby possible.

This result can be achieved even when the fit between the carrying roller and sleeve-shaped body is relatively short.

The proposed bearing arrangement is preferably used in open cast mining and is an essential constituent of a carrying roller device here. There is here a high demand for high-quality and light bearing arrangements which are distinguished by a long service life and convenient operation.

Precisely, but not only, in this application, a reduction in the weight of the bearing arrangement can be achieved; that is to say, an arrangement having a relatively light build is implemented. Furthermore, an optimized oscillation behavior can be achieved by the homogenous structure of the microscopic interlock which arises on account of the proposed coating.

The microscopic interlock arising on account of the coating with grains or with molybdenum offers in this case a completely novel possibility for the mounting of carrying rollers. There is no need for a welding of components in the bore of the carrying roller casing, but high twist prevention is nevertheless afforded. Since welding is dispensed with, welding distortion, which may otherwise cause the risk of an unbalance, can also be avoided. Nor do any weld-induced coaxiality errors occur. There is therefore no need for any balancing of the assembled carrying roller, that is to say for any attachment of balancing elements. Despite the fact that welding is dispensed with, a creeping movement between the parts can be ruled out.

Thus, the combination of the proposed coating with, at the same time, a press fit between the carrying roller and sleeve-shaped body makes it possible reliably to prevent the occurrence of fretting corrosion, while no variation in the coaxiality of the components occurs under high load. The assembling or mounting method can in this case be implemented cost-effectively.

BRIEF DESCRIPTION OF THE SEVERAL VIEWS OF THE DRAWINGS

An exemplary embodiment of the invention is illustrated in the drawing in which.

DETAILED DESCRIPTION OF THE INVENTION

Figure 1:
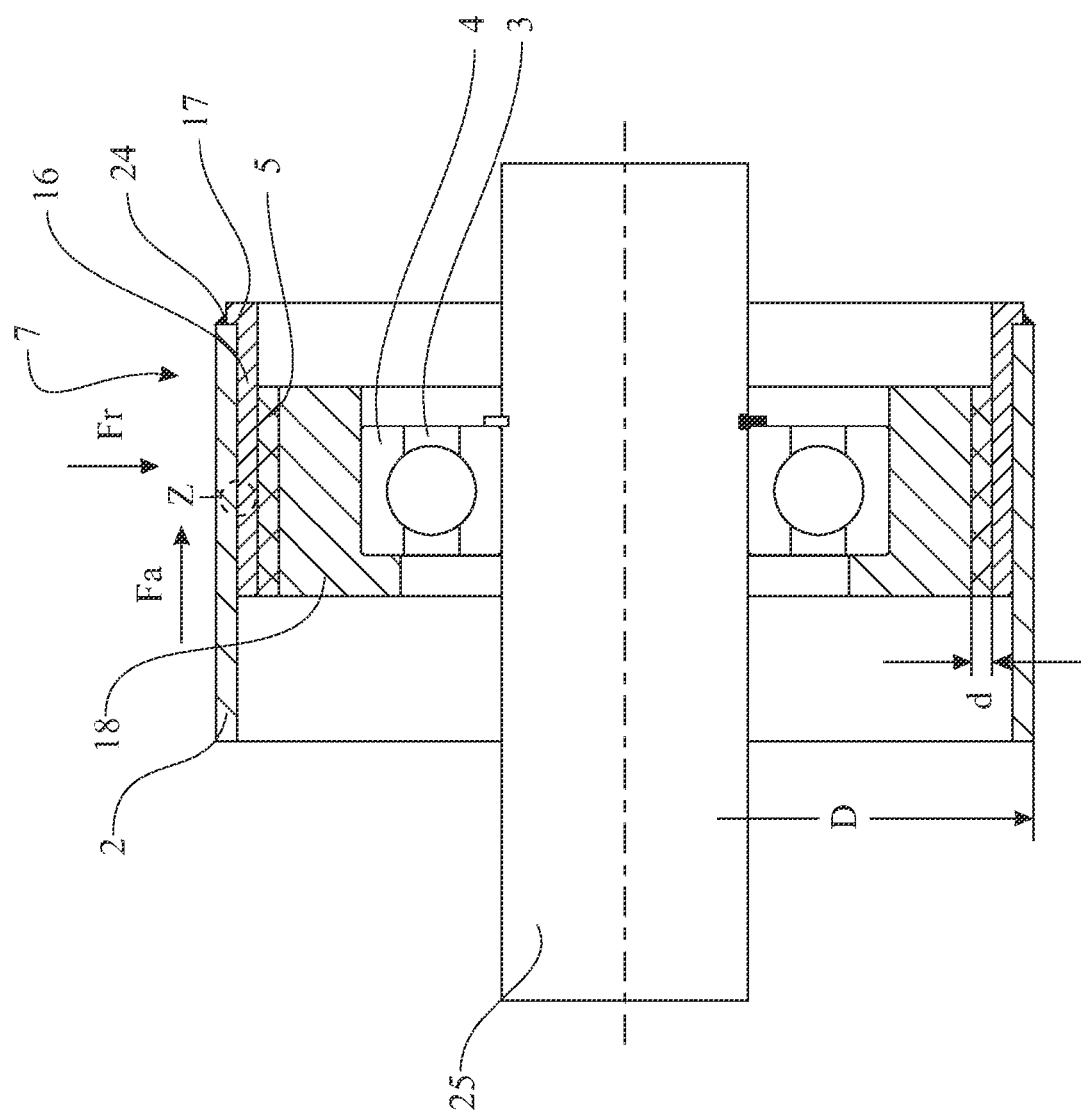
FIG. 1 shows a radial section through a bearing arrangement with a carrying roller which is supported by a bearing, a cover which closes off the axial end not being illustrated.

In FIG. 1 can be seen a bearing arrangement 1 which serves for supporting a carrying roller 2 of a conveyor device. A shaft 25, on which a grooved ball-bearing 3 is secured, is illustrated. The outer ring 4 of the grooved ball-bearing 3 carries a carrier body 18 having a one-sided rim which surrounds the outer ring 4 axially and forms an axial bearing surface for the latter.

The carrying roller 2 is designed as a hollow-cylindrical component, that is to say as a tube, a bearing arrangement 1, as can be seen in FIG. 1, being arranged in the two axial end regions. A sleeve-shaped body 16 is pressed into the inwardly directed surface of the carrying roller 2 and is seated with a press fit in the carrying roller 2. A damping layer 5 composed of elastomeric or rubber material is arranged between the sleeve-shaped body 16 and the carrier body 18 and in the present case is designed as a hollow-cylindrical layer. The elastomeric or rubber material may be connected directly to the sleeve-shaped body 16 and/or to the carrier body 18 by means of an injection molding process or a vulcanization process.

In this case, there is provision for the radial thickness d of the damping layer 5 (see FIG. 1) to lie in a defined size range which in the present case is determined in relation to the outside diameter D of the carrying roller 2. To be precise, the thickness d preferably lies in a range of between 1 and 10%, preferably of between 1.5% and 4%, of the outside diameter D. This value ensures that, on the one hand, a sufficient damping of the carrying roller is afforded, but, on the other hand, a sufficiently accurate and rigid guidance of the carrying roller is ensured.

It is advantageous that the sleeve-shaped body 16 is arranged in at least one axial part region of the carrying roller 2 between the inner cylindrical surface of the carrying roller 2 and the damping layer 5, projects axially beyond the carrying roller 2 on one side and has in the axial end region of the carrying roller 2 a radially outwardly extending collar 17. This collar 17 may also be referred to as a protrusion and forms a defined axial stop for the carrying roller 2. An axial fixing of the carrying roller 2 in relation to the sleeve-shaped body 16 is consequently possible in a simplified way.

The carrying roller 2 and the sleeve-shaped body 16 are in this case connected fixedly to one another. As indicated in FIG. 1, a weld seam 24 runs between the axial end of the carrying roller 2 and the collar 17. This weld seam 24 proceeds around the entire circumference of the carrying roller 2 or collar 17.

As a result of the damping layer 5 being injection-molded on or vulcanized, in addition to the radial forces $F_r$, axial forces $F_a$, too, can be transmitted via the damping layer 5 and consequently between the bearing 3 and carrying roller 2.

Figure 2:
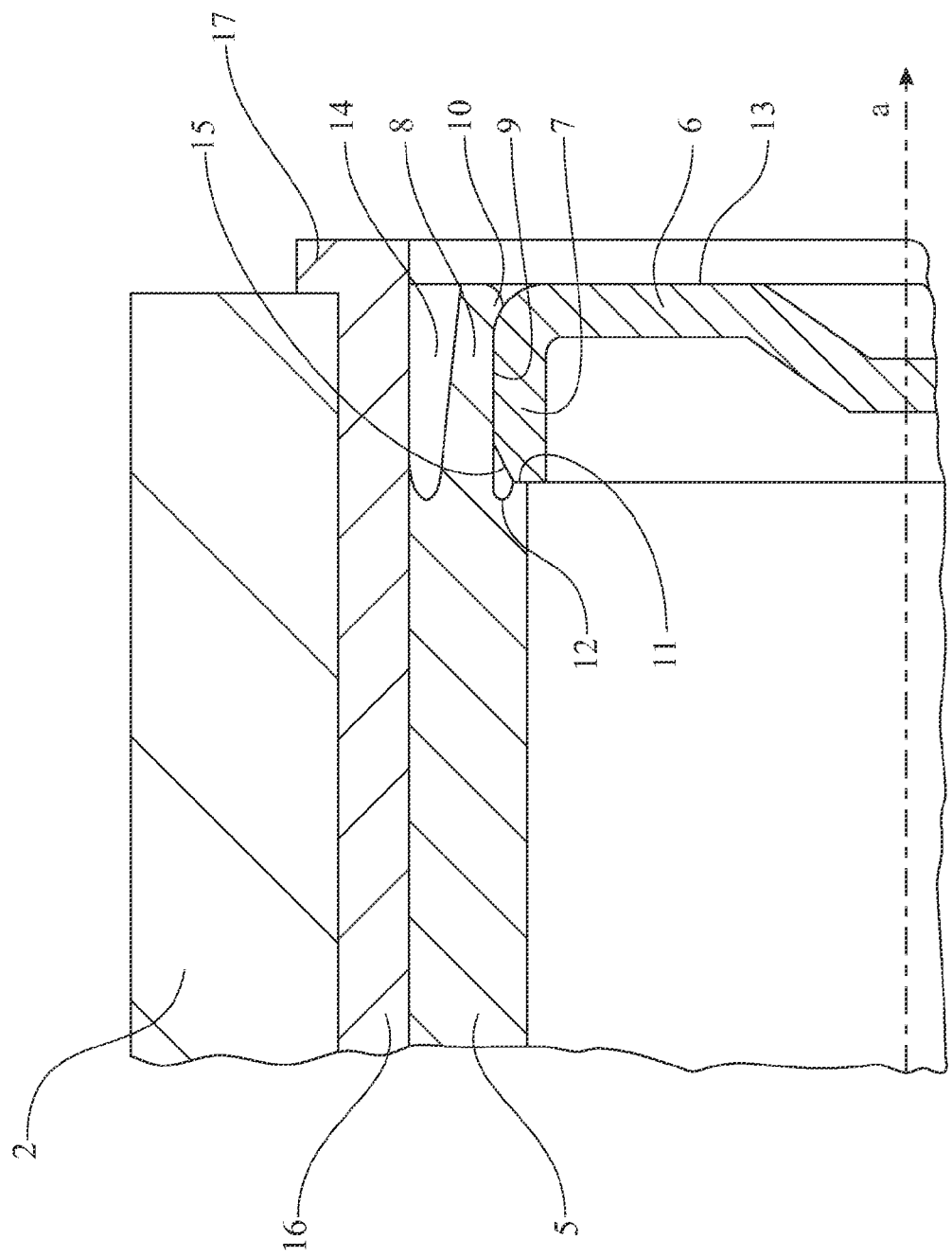
FIG. 2 shows the upper, right end region of the bearing arrangement, together with carrying roller, according to FIG. 1 in an enlarged illustration, the closing-off cover being illustrated here.

Details of the proposed embodiment may be gathered from FIG. 2. A cover 6 is outlined here, which is inserted and fastened at the axial end of the bearing arrangement on the end face and prevents the penetration of impurities. In this case, a design is provided, whereby the cover 6 has an annular portion 7 extending in the axial direction a. In the mounted state, this hollow-cylindrical portion 7 is arranged in a holding portion 8 and is held by this. The holding portion 8 is shaped out of the material of the damping layer 5 in an axial end region of said damping layer.

As can be seen in FIG. 2, the holding portion 8 has a radially inwardly pointing cylindrical seat surface 9 for the annular portion 7. Furthermore, a radially inwardly projecting projection 10 is present on the holding portion 8 and proceeds around the entire circumference of the holding portion 8.

Furthermore, the damping layer 5 has a bearing surface 11 which is designed for the bearing of the cover 6. This bearing surface 11 has a surface normal which points in the axial direction a. The transition between the bearing surface 11 and the cylindrical seat surface 9 is formed by a recess 12 in the form of an annular groove which may be designated as an undercut.

As can be seen, furthermore, the holding portion 8 extends axially exactly as far as an outer surface 13 of the cover 6, thus resulting to that extent in a flush outer closing-off surface.

In the present case, in the radially outer region of the holding portion 8, an annularly proceeding recess 14 is provided which allows the holding portion 8 to spring up radially when the cover 6 is pushed in (from the right) during assembly, so that the latter comes to lie in the position outlined. The mounting process is made easier by an introduction slope 15 which is incorporated in the axial end region of the annular portion 7 of the cover 6.

The recesses 14 may alternatively also extend only over short circumferential regions and, as seen in the axial direction, constitute a star-shaped arrangement.

The recess 14 is in this case therefore designed as a cavity allowing axial removal from the mold, with or without intermediate webs.

After assembly, the elastomeric material of the holding portion 8 surrounds the annular portion 7 of the cover 6 by means of an interlock with appropriate overlap and thus ensures a high degree of leaktightness. However, after the cover 6 has been pressed axially into the elastomeric material, the projection 10 also prestresses it axially, so that the end face of the cover 6 or, more specifically, the end face of its annular portion 7 bears against the bearing surface 11 and thus also provides an axial seal.

Figure 3:
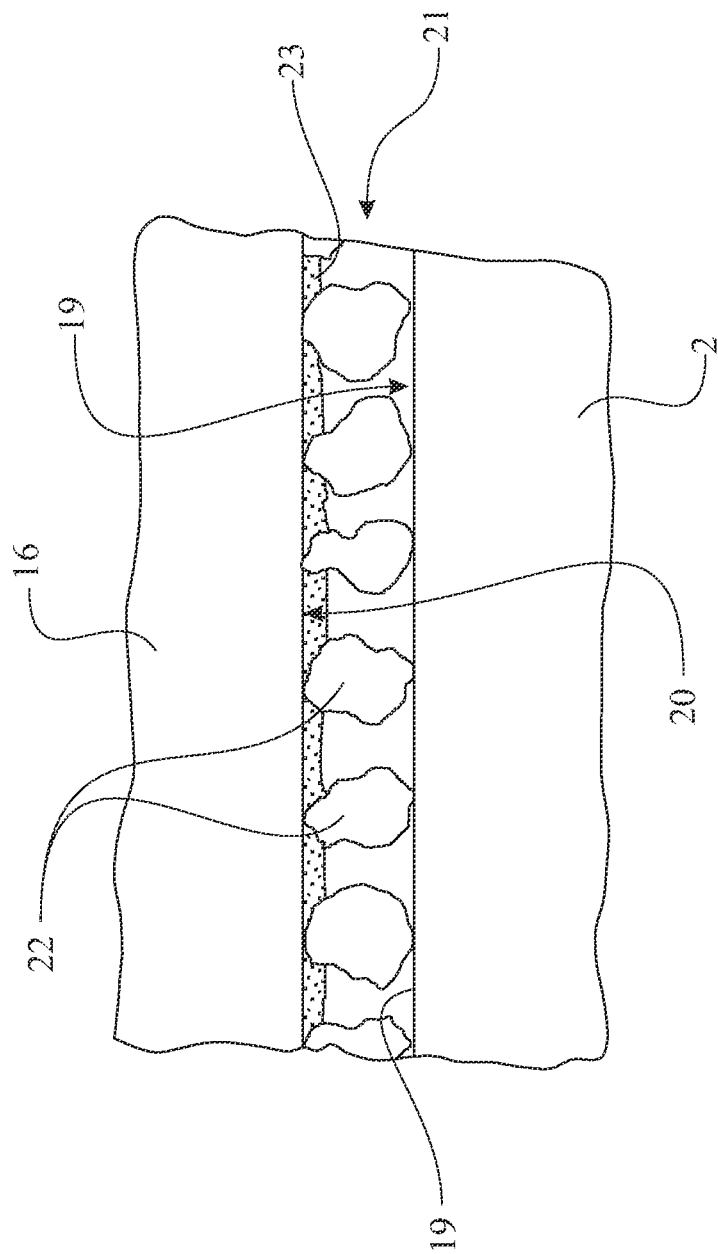
FIG. 3 shows the detail "Z" according to FIG. 1.

FIG. 3 illustrates the detail "Z" according to FIG. 1, and it should be noted that this is a diagrammatic illustration. A coating 21 is illustrated, which has a friction-increasing action and which is arranged between the inner surface 19 of the carrying roller 2 and the outer surface 20 of the sleeve-shaped body 16.

Grains 22 can be seen which consist of diamond, of silicon carbide (SiC), of corundum, of boron nitride (CBN) or of other hard substances. The grain diameter preferably ranges between 20 μm and 60 μm. The grains are fixed to a component, in the exemplary embodiment to the outer-cylindrical surface of the sleeve-shaped body 16, by means of a binder 23 in the form of a nickel layer applied by electroplating.

In this case, the coating in question is advantageous especially in the end region of the sleeve-shaped body 16, since corrosion protection can also be achieved by means of the coating. To be precise, the penetration of moisture may easily occur there on account of the capillary action between the components. This can be counteracted especially beneficially if the coating provided is manganese phosphating. In particular, chemical nickel plating has proved appropriate. This is obtainable on the market, for example, under the designation "Durni Coat". The occurrence of fretting corrosion is thus effectively counteracted.

LIST OF REFERENCE

1 Bearing arrangement
2 Carrying roller
3 Bearing (rolling bearing)
4 Bearing ring
5 Damping layer
6 Cover
7 Annular portion
8 Holding portion
9 Cylindrical seat surface
10 Projection
11 Bearing surface
12 Recess in the form of an annular groove
13 Outer surface
14 Recess
15 Introduction slope
16 Sleeve-shaped body
17 Collar
18 Carrier body
19 Inner surface of the carrying roller
20 Outer surface of the sleeve-shaped body
21 Coating
22 Grain (diamond, SiC, CBN)

23 Binder (nickel)
24 Weld seam
25 Shaft
$F_r$ Radial force
$F_a$ Axial force
a Axial direction
d Radial thickness of the damping layer
D Outside diameter of the carrying roller

The invention claimed is:

1. A bearing arrangement comprising:
an at least partially hollow, generally cylindrical carrying roller having at least one axial end,
at least one bearing configured to support the carrying roller and having an outer ring,
a damping layer formed of elastomeric material and disposed between the bearing outer ring and the carrying roller, and
a cover configured to close off the at least one axial end of the carrying roller,
wherein the damping layer includes a holding portion formed in an axial end region and the cover retained within the holding portion,
wherein the damping layer has a bearing surface facing the cover and arranged radially within the holding portion and
wherein an axially extending recess in the form of an annular groove is arranged between the holding portion and the bearing surface.

2. The bearing arrangement as claimed in claim 1, wherein the cover has an annular portion which extends in an axial direction, the cover annular portion being disposed within and retained by the damping layer holding portion.

3. The bearing arrangement as claimed in claim 1, wherein the holding portion has a radially inwardly directed cylindrical seat surface.

4. The bearing arrangement as claimed in claim 3, wherein a radially inwardly directed projection is arranged in the axial end region of the cylindrical seat surface.

5. The bearing arrangement as claimed in claim 4, wherein the radially inwardly directed projection extends about the entire circumference of the holding portion or is subdivided into circumferential segments.

6. The bearing arrangement as claimed in claim 1, wherein a line normal to the bearing surface extends generally in the axial direction.

7. The bearing arrangement as claimed in claim 1, wherein the holding portion extends axially as far as the axial position of a radially extending outer surface of the cover.

8. The bearing arrangement as claimed in claim 1, wherein the damping layer includes at least one recess located radially outside the holding portion.

9. The bearing arrangement as claimed in claim 8, wherein the at least one recess is formed as an annular groove extending around the entire circumference of the damping layer or the at least one recess includes a plurality of generally arcuate recesses distributed around the circumference of the damping layer.

10. The bearing arrangement as claimed in claim 8, wherein the at least one recess comprises a plurality of generally arcuate recesses distributed around the circumference of the damping layer wherein the damping layer includes a plurality of webs defined between adjacent arcuate recesses, the webs being arranged generally equidistantly around a circumference of the damping layer.

11. The bearing arrangement as claimed in claim 1 further comprising a sleeve-shaped body arranged in an axial region of the carrying roller between the inner cylindrical surface of the carrying roller and the damping layer.

12. The bearing arrangement as claimed in claim 11, wherein the sleeve-shaped body projects axially beyond the carrying roller on one side and has in the axial end region of the carrying roller a radially outwardly extending collar.

13. The bearing arrangement as claimed in claim 11, wherein the carrying roller has an inner surface facing the sleeve-shaped body, the sleeve-shaped body has an outer surface facing the roller, and at least a portion of at least one of the roller inner surface and the sleeve-shaped body outer surface is provided with a friction-increasing coating.

14. The bearing arrangement as claimed in claim 13, wherein one of:
the friction-increasing coating includes one of diamonds, silicon carbide, corundum and boron nitride, or
the friction increasing coating is a molybdenum layer.

15. The bearing arrangement as claimed in claim 14, wherein at least one of:
the one of the diamonds, silicon carbide, corundum and boron nitride includes grains with a diameter range of between 1 µm and 100 µm, and
the one of the diamonds, silicon carbide, corundum and boron nitride is bonded to the at least one of the carrying roller and the sleeve-shaped body by means of a binder.

16. The bearing arrangement as claimed in claim 11, wherein the carrying roller and the sleeve-shaped body are coupled by a press fit.

17. The bearing arrangement as claimed claim 1, wherein the damping layer is formed as a hollow-cylindrical element.

18. The bearing arrangement as claimed claim 1, further comprising a carrier body disposed between the damping layer and the outer ring of the bearing.

* * * * *